Dec. 28, 1948.   W. S. HERBERT ET AL   2,457,234
APPARATUS FOR ELECTROLYTICALLY DETERMINING
THE THICKNESS OF METAL COATINGS
Filed Sept. 25, 1943
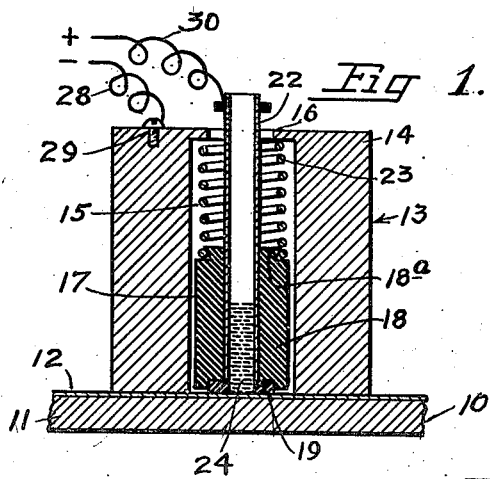
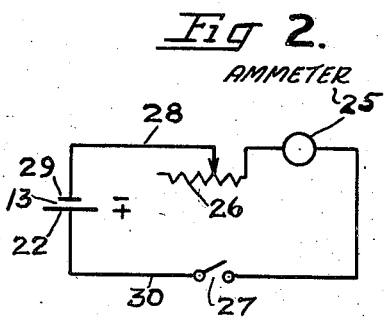
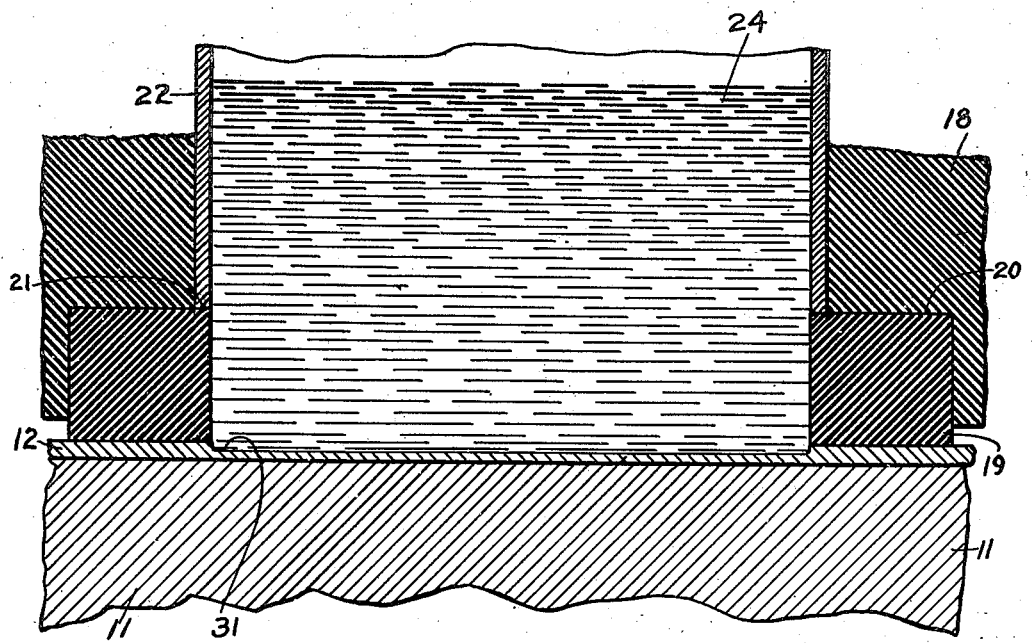
Inventors
WILLIAM S. HERBERT.
HOWARD T. FRANCIS.
by  Charles W Hill  Attys Patented Dec. 28, 1948

2,457,234

UNITED STATES PATENT OFFICE 2,457,234

APPARATUS FOR ELECTROLYTICALLY DETERMINING THE THICKNESS OF METAL COATINGS

William S. Herbert, Madison, Wis., and Howard T. Francis, Chicago, Ill., assignors to Armour Research Foundation of Illinois Institute of Technology, a corporation of Illinois Application September 25, 1943, Serial No. 503,828

2 Claims. (Cl. 204—195)

This invention relates to a method of and to an apparatus for determining the thickness of metal coatings on foundations of dissimilar metals or alloys, or of a nonmetallic character.

Previous methods that have been generally used for measuring the thickness of metallic coatings include the following:

1. Magnetic or electromagnetic method.
2. Jet test and spot test.
3. Dropping test, and immersion test.
4. Chemical or electrolytic stripping and weighing, or analysis.
5. Electrochemical stripping of a small area at constant current.
6. Microscopic method.
7. Chord method.

All of the above tests are fully described in the literature and can be found adequately discussed in the "Plating and Finishing Guide Book," (1945), published by Metal Industries Publishing Co., 11 West 42nd Street, New York, New York.

The first three of the above methods do not give very accurate results. The first method is applicable only to certain combinations of coating and base metal (by which term is meant the foundation of metal), and in many cases does not give very reliable results for thin coatings. The second and third methods are subject to many variables and require close temperature control for accurate results. The fourth method is applicable only to determining the average thickness for fairly large areas. It is less accurate when used for thinner coatings. The fifth method has been used for determining the thickness of chromium plating and is inherently quite accurate, but it has the disadvantage that the end-point is not so sharp as desirable and that the apparatus is neither protable nor simple to operate. The microscopic method requires expensive equipment and a skilled operator and also is not applicable to coatings of soft metal. The chord method is not very accurate and can be applied to flat surfaces only with difficulty.

It is therefore evident that with the greatly expanded production of plated metal strip, there is an urgent need for a simple and accurate method and device for testing and controlling the thickness of the metal coatings.

We have found that the thickness of metal coatings can be rapidly and accurately determined by making a small area of the coating the anode in an electrolytic or voltaic cell and then discharging the cell at constant current until the metal coating is completely removed. According to Faraday's law, the current-time product multiplied by the proper factor, gives the weight of metal removed. Since the metal is removed from a definite area, the thickness of the metal deposit can be calculated by the formula $$t = \frac{w}{d \times a}$$

in which $t$ is the thickness, $w$ the weight of metal removed, $d$ the density of the metal and $a$ the area. The instrument can also be standardized by applying the cell to coatings of known thickness. The latter method is useful when the metal coating does not disolve at 100% efficiency according to Faraday's law, but does dissolve in a reproducible manner.

It is therefore an important object of this invention to provide a method whereby the thickness of metallic coatings can be determined rapidly and with high accuracy.

It is a further important object of this invention to provide a method for determining the thickness of the part of metallic coatings unalloyed to the base or foundation metal, and thus to ascertain the thickness of both the alloyed and unalloyed portions of the coating.

It is a further important object of this invention to provide a simple and convenient apparatus for carrying out the method herein described for measuring the thickness of metallic coatings.

It is further important object of this invention to provide a device for use in determining the thickness of metal coatings that is readily portable and that requires no outside source of current.

Other and further important objects of this invention will become apparent from the following description and appended claims.

On the drawings:

Figure 1 is a sectional view of an apparatus for use in determining the thickness of metal coatings, embodying the principles of our invention, illustrated in operative position with respect to a portion of a metal coating the thickness of which is to be determined.

Figure 2 is a wiring diagram illustrative of the apparatus and method used in accordance with this invention for determining the thickness of metal coatings.

Figure 3 is a greatly enlarged fragmentary sectional view of the device illustrated in Figure 1.

As shown on the drawings:

The reference numeral 10 indicates generally a wall or sheet, having a base or foundation metal 11 and a coating 12 on one surface thereof. The thickness of the coating 12 may be measured by means of the apparatus about to be described, in accordance with the method of our invention.

The apparatus of our invention comprises what may be termed a voltaic cell, which is used as a stripping cell for removing the metal coating over a predetermined area thereof. Said stripping cell, which is indicated generally by the reference numeral 13, comprises a cylindrical metallic member 14, having an axial cavity 15 that is cylindrical in shape and that is restricted at its upper end by an inturned annular shoulder 16. The cylindrical member 14 is adapted to be positioned upon the coating 12 and to rest thereon by gravity to form good electrical contact therewith.

Within the cavity 15 is positioned a composite insulating and sealing member 17, which functions as a piston and comprises a cylinder 18 of plastic material, rubber or the like, in the lower end of which is fixedly positioned a sealing washer or gasket 19. Said sealing washer 19 extends beyond the lower edge of the cylinder 18 to rest upon said coating 12. The sealing washer 19 also extends inwardly of the inner cylindrical surface of said wall 18, as at 21, to provide an annular shoulder against which rests the lower end of a hollow electrode 22. Said hollow electrode 22 is thus insulated by means of said sealing washer 19 from the metal coating 12.

A coiled spring 23 is positioned about said hollow electrode 22, with its lower end resting against the upper end of said cylinder 18 and centered thereon by a reduced cylindrical portion 18a. The upper end of said spring 23 bears against the inturned annular shoulder 16. Said spring 23 is thus held under pressure between said annular shoulder 16 and the piston-like member 17 to urge the sealing washer 19 into sealing contact with said coating 12.

An electrolyte 24 is adapted to be introduced into the interior of the hollow electrode 22 to partially fill the same. Said electrolyte 24 is confined by means of the sealing washer 19 to contact said coating 12 over a predetermined area thereof only. The spring urged sealing washer 19 prevents the lateral spreading of the electrolyte over the surface of the coating 12.

As illustrated in Figure 2, the stripping cell 13 may be connected in an external circuit, including a variable resistance 26, an ammeter 25, and a switch 27. One of the wires 28 of the circuit, leads from the negative side of the cell 13, constituted by a terminal 29 secured in the metallic cylinder 14. The other wire, 30, leads from the positive side of the cell 13, i. e. the hollow electrode 22. Said electrode 22, thus, serves as the cathode in the cell, while the metal coating 12, itself, serves as the anode, and is in direct electrical contact with the cylindrical member 14. When the switch 27 is closed, the action of the electrolyte 24 upon the electrode 22 and coating 12 sets up an electric current which flows through the external circuit represented by the wires 28 and 30.

The operation of the device just described is as follows:

The metal coated article 10 to be tested is made the anode in the stripping cell 13, and a sufficient amount of a suitable electrolyte 24 is introduced into the hollow cathode 22. The rheostat 26 is adjusted to a predetermined point, at which the proper amount of current will be drawn from the cell. Then the circuit is closed by the switch 27 and simultaneously a stopwatch is started. During the test it will probably be necessary to adjust the current to a constant value by means of the rheostat 26, the value of the current being indicated on the ammeter 25, which may be a milli-ammeter or a micro-ammeter. The end-point, or the removal of all of the coating metal 12, is shown when the curent changes rapidly and can no longer be adjusted to the constant value by the rheostat. At this point the stopwatch is stopped and the switch 27 opened to turn off the current of the cell. The time required, when multiplied by a factor determined for the particular instrument, will give the thickness or weight of the coating. This factor depends upon the electrochemical equivalent and density of the coating metal, the current used and corrections for any inaccuracy in the current meter, the dimensions required for expressing the thickness, and the area of the metal coating which has been stripped.

Within certain limits it is possible to adjust the current and area of coating stripped so that a measurement may be made in a few minutes. However, generally the anode current density should not be so high that the anode efficiency is below 100%. Sometimes it is possible to operate at higher current densities if the results are reproducible and a standard metal coating is used for calibration. To avoid too frequent adjustment of the current, the cathode current density should also be kept fairly low. It is quite often advantageous to have the cathode area considerably larger than the anode area.

By way of example, the thickness of a thin tin electroplate on steel may be determined in about two minutes with an accuracy of about 2%. In this case, it is convenient to use, as the electrolyte, an aqueous sodium hydroxide solution of about 10% strength. However, other basic solutions may also be used.

Tarnished brass or copper makes an excellent cathode. Brass or copper can be given a tarnish film, probably copper oxide or copper hydroxide, by dipping the cathode in the electrolyte, and, while wet, exposing it to the air for several minutes until a dark film is formed.

In this type of stripping cell, using an aqueous sodium hydroxide solution as the electrolyte and a tarnished brass or copper cathode, the tin is dissolved according to Faraday's law as the stannite at a current density of about 5–10 amperes per square foot. In order to increase the constancy of the current, an oxidizing agent such as hydrogen peroxide, sodium hypochlorite and the like may be added in small amounts. For instance, a few drops of hydrogen peroxide solution may be added near the cathode after the cell has started to operate. However, if the peroxide is added to the electrolyte before the cell is externally connected, it will polarize the tin surface and make the cell inoperative. The end-point of the measurement is obtained when the current rapidly falls to near zero. This corresponds to the complete removal of the tin. In some arrangements of the cell, the removal of the last traces of the tin can be observed visually.

As indicated in Figure 3, the surface of the metal coating 12 is gradually dissolved away by anodic attack of the electrolyte upon the metal of said coating, the extent of this anodic attack being limited, as indicated at 31, to the area of the surface of the coating 12 defined by the sealing ring or washer 19. Eventually, the coating 12 is eaten away down to the base metal 11, at which time the current falls to or near zero.

A stripping cell such as above described can also be used for determining the thickness of tin coatings on copper, nickel and other metals, of zinc coatings on steel, iron and other metals, and of cadmium coatings on steel, iron and other metals. It is usually advantageous to select an electrolyte in which the base metal is insoluble or substantially so, thus giving a sharp end-point. In that case, there is a rapid decrease in the voltage of the stripping cell at the end-point and a corresponding decrease in the current. It is also possible to use acid solutions, with or without inhibitors, and certain salt solutions for electrolytes. By a suitable choice of cathode material and electrolyte, measurements can be made for many combinations of coatings and base metals. For the measurement of zinc and lead coatings, a 10% aqueous caustic soda solution can be used, the same as for tin.

The thickness of the portions of the metal coating unalloyed or alloyed with the base metal may be ascertained by the method and apparatus of our invention. Thus, in the example given above, the tin is removed in the stripping cell, but any iron-tin alloy layer such as is present in hot-dipped tinplate or fused electro-tinned steel is unaffected. By removing the alloy layer by some other method, such as acid stripping, then the thickness of both the tin and alloy layers can be determined. Similar results can be obtained when iron-zinc, nickel-tin and nickel-zinc alloy layers are involved, and there are many other possible combinations which could be treated likewise. In many cases it is possible by this means to detect and measure alloy layers which are not readily visible by microscopic examination. Such a technique should be very valuable in studying the interdiffusion of adjacent metal layers and the effect of treatments such as cleaning and etching on this diffusion.

In the above description of this invention, it has been shown that the thickness of metal coatings can be simply and rapidly measured by a method wherein a definite area of the metal coating is made the anode of a voltaic cell, and the cell is discharged at constant current until the coating has been removed. When the metal is dissolved at 100% anode efficiency, the thickness of the coating can be calculated by the use of Faraday's law. In a specific example, the thickness of tin on tin plated steel is determined by making the tin the anode in a cell with a sodium hydroxide electrolyte and a brass or copper cathode.

In the stripping cell above described, the spring 23 is of such dimensions and loading characteristics that about one-half the weight of the cylinder 14 will be impressed upon the piston-like member 17. This provides a tight seal on the washer 19 and also allows good contact between the cylinder 14 and the metal coating 12. In actual practice, it is convenient to connect the stripping cell 13 through a foot or more of double wire cord to the other instruments, such as the variable resistance 26, milli-ammeter 25 and switch 27, mounted in a box. This permits the maximum flexibility in the operation of the instrument.

Various modifications of the construction of the stripping cell are possible. For example, the cylinder 14 can be made of material other than metal, and a connection to the metal coating 12 may be made by means of lugs or pins projecting from the base of the cylinder. The central cathode 22 may be of non-uniform cross-sectional area, as for instance by enlarging the upper portion to provide greater cathode area. Also, the cathode 22 and the gasket or washer 19 may have other cross-sectional shapes than circular. Other modifications will be apparent to those skilled in the art.

As a further example of specific constructional features and operating conditions, the member 14 may be a steel cylinder, two inches in diameter and two inches high. The piston-like member 17 may be three-quarters of an inch in diameter by one inch in length, and made of Bakelite, lucite or other plastic. The cathode tube 22, fitted tightly within the piston-like member 17, may be two and one-half inches in length by three-sixteenths inch outside diameter copper tubing. The gasket or washer 19 may be cut from three-sixteenths inch inside diameter heavy walled rubber tubing.

In the operation of the above cell for thin tin coatings, the milli-ammeter 25 may have a capacity of two or five milli-amperes. The variable resistance 26 used to control the current from the stripping cell may be a variable wire wound rheostat with a maximum resistance of 600 ohms. When these instruments are used and a current of 2 milli-amperes drawn, the thickness of a tin coating of about 0.5 lb./base box (435.5 sq. ft.) is measured in about two minutes. For heavier tin coatings and for the usual zinc coatings, it is necessary to discharge the cell at a higher current or reduce the area stripped in order to reduce the time required for a measurement. In some cases this will necessitate the use of a cathode with more surface area. The same result can also be achieved by placing more electrolyte in the cathode tube.

The procedure for making a measurement with the above described cell is as follows. The stripping cell is placed on the sheet of tinplate over the desired area and the top of the cathode pushed down to insure good contact between the gasket and the tinplate. Then with an elongated medicine dropper a few cubic centimeters of the electrolyte are placed in the cathode tube. The rheostat is then set to a predetermined position, the switch closed and a stop watch started. In order to eliminate any further need for adjusting the rheostat to obtain constant current, a drop of hydrogen peroxide solution may be added to the electrolyte in the cell. The endpoint of the measurement is determined when the current drops very sharply and can no longer be held constant by the rheostat. At this point the stopwatch is stopped and the cell switched off. The number of seconds required multiplied by the factor for the cell and ammeter, gives the thickness or weight of the coating, depending upon what factor is used. The electrolyte is then sucked out of the cell with the medicine dropper and the cell rinsed with water. The cell is removed from the tinplate and the tinplate and cell gasket blotted with cleansing tissue. The cell is now ready for another determination. With such a stripping cell it is possible to measure the local thickness for very small and close areas and thus obtain the distribution of coating across larger areas.

It will, of course, be understood that various details of the process and apparatus may be varied through a wide range without departing from the principles of this invention and it is, therefore, not the purpose to limit the patent granted hereon otherwise than necessitated by the scope of the appended claims.

What we claim is:

1. Apparatus for use in determining the thickness of a metal coating over a dissimilar foundation metal, comprising an open-ended hollow metal member for direct gravity contact with the coating to be measured, said member having an upper inturned annular shoulder, annular insulating and sealing means movable within said member for resting against said coating to define a predetermined area thereof, resilient means between said shoulder and said annular insulating and sealing means transmitting a part only of the weight of said metal member to urge said insulating and sealing means against said coating, a hollow electrode extending into said metal member and fitted into said annular insulating and sealing means to form the side walls of a receptacle for an electrolyte, and external electrical connections to said electrode as the cathode and said metal member as the anode to complete an electrical circuit including said electrode, metal member and said electrolyte to effect an anodic dissolution of metal from said coating over said predetermined area.

2. A voltaic stripping cell for use in determining the thickness of a metal coating over a dissimilar foundation metal, comprising a metal member for direct gravity contact with the coating to be measured and having a vertically extending recess, annular insulating and sealing means movable within said recess for contact with said coating to confine an area thereof, a hollow cathode fitted into said annular insulating and sealing means and movable therewith to form the side walls of a receptacle for an electrolyte and insulated by said insulating and sealing means from said metal member and from said coating, cushioning means cooperating with said member and with said insulating and sealing means and transmitting a part only of the weight of said member to urge the said insulating and sealing means tightly against said coating, and external electrical connections between said cathode and said metal member as the anode to complete an electrical circuit including said cathode, anode and electrolyte to effect a stripping of metal from said coating over said confined area.

WILLIAM S. HERBERT.
HOWARD T. FRANCIS.

REFERENCES CITED

The following references are of record in the file of this patent:

UNITED STATES PATENTS

| Number | Name | Date |
|---|---|---|
| 1,739,657 | Shemitz | Dec. 17, 1929 |
| 1,725,877 | Maag | Aug. 27, 1929 |
| 1,771,680 | Ichisaka | July 29, 1930 |
| 2,135,873 | Jones et al. | Nov. 8, 1938 |
| 2,206,026 | Buser | July 2, 1940 |
| 2,319,196 | Anderson et al. | May 18, 1943 |

FOREIGN PATENTS

| Number | Country | Date |
|---|---|---|
| 483,503 | Great Britain | June 2, 1937 |

OTHER REFERENCES

"Journal of Applied Physics," October 1939, pp. 726 through 727.

"Metallurgia," December 1943, pp. 101 and 102.

"Electrochemistry," by W. A. Koehler (1944), second edition, p. 53.